United States Patent [19]
Youngers et al.

[11] Patent Number: 6,037,582
[45] Date of Patent: *Mar. 14, 2000

[54] OPTICAL SCANNER WITH A CURVED BULB

[75] Inventors: Kevin J. Youngers, Greeley; Jerry L. Bybee, Loveland, both of Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/902,818

[22] Filed: Jul. 30, 1997

Related U.S. Application Data

[63] Continuation-in-part of application No. 08/846,366, Apr. 30, 1997, abandoned.

[51] Int. Cl.$^7$ ..................................... H01J 3/14
[52] U.S. Cl. ..................... 250/234; 362/217; 358/509
[58] Field of Search ................ 250/234, 235, 250/208.1, 216; 358/474, 509; 362/217, 221, 225

[56] References Cited

U.S. PATENT DOCUMENTS

| | | | |
|---|---|---|---|
| 3,867,569 | 2/1975 | Watson | 178/7.1 |
| 5,019,703 | 5/1991 | Boyd et al. | 250/208.1 |
| 5,229,590 | 7/1993 | Harden et al. | 250/235 |
| 5,523,562 | 6/1996 | Maple | 250/235 |
| 5,669,700 | 9/1997 | Wendel | 362/223 |

FOREIGN PATENT DOCUMENTS 62-055631  9/1988  Japan.

*Primary Examiner*—Que T. Le
*Attorney, Agent, or Firm*—Cynthia S. Mitchell

[57] ABSTRACT

A line-focus system with a curved fluorescent bulb for directing light from the curved fluorescent bulb toward the scan line in the line-focus system. The curved fluorescent bulb is shaped in such a manner that the light intensity across the photosensor line array in the line-focus system is relatively uniform and the length of the light bulb is shorter than straight light bulbs with end sockets at both ends of the light bulb. The curved fluorescent bulb may be C-shaped, U-shaped or towel bar-shaped.

28 Claims, 13 Drawing Sheets

OPTICAL SCANNER WITH A CURVED BULB

This application is a continuation-in-part of the U.S. patent application Ser. No. 08/846,366 filed Apr. 30, 1997, abandoned.

FIELD OF THE INVENTION

The present invention relates generally to line-focus systems and, more particularly, to a curved light source for controlling image plane light level distribution in line scan optical imaging systems.

BACKGROUND OF THE INVENTION

Line-focus systems are utilized in optical scanners and other optical imaging devices. In a line-focus system, a light beam from an illuminated line object is imaged by a lens onto a linear photosensor array which is positioned remotely from the line object. The linear photosensor array is a single-dimension array of photoelements which correspond to small area locations on the line object. These small area locations on the line object are commonly referred to as "picture elements" or "pixels". In response to light from its corresponding pixel location on the line object, each photosensor produces a data signal which is representative of the light intensity which it experiences. All of the photoelement data signals are received and processed by an appropriate data processing system. In an optical scanning device, the illuminated line object of the line-focus system is commonly referred to as a "scan line".

FIG. 1 illustrates a typical optical scanner 100 of a type adapted to produce machine readable data representative of an image of an object which is scanned. The machine readable data produced by the optical scanner 100 is adapted to be received and used by a digital computer in a conventional manner, e.g. the data may be stored in a computer memory device or may be used to produce a display of the object on a CRT or an electrostatic print, etc. The optical scanner 100 comprises a scanner housing 102 having a forward end 101, a rear end 103 and a central longitudinal axis AA, FIGS. 1 and 2. The upper panel member 104 comprises a transparent plate 108 which may be approximately laterally centered therein.

FIG. 2 shows the lower housing member 106 comprising a generally rectangularly shaped bottom wall 110. A front wall 112, rear wall 114 and lateral sidewalls 116, 118 are integrally formed with the bottom wall 110. Post members 111, 113 etc. are provided for attaching the upper panel member to the lower housing member. As best illustrated in FIG. 2, a longitudinally extending shaft 120 is supported at opposite ends thereof by brackets mounted on the front and rear housing walls 112, 114.

An electrical power supply unit 123 is fixedly mounted to the lower housing member between sidewall 116 and riser 122. An electronic controller board 124 is fixedly mounted on bottom wall 110 at a rear end portion thereof. The controller board 124 receives power from power supply unit 123 through power cable 125. The controller board is electrically connected with a light processing assembly 162 mounted in a carriage assembly 140 through an electrical cable 126.

An electric motor 130 which receives power through electrical supply cable 132 connected to controller board 124 is fixedly mounted to the bottom wall at a location proximate lateral wall 118 at a rear end portion of the housing member. The electric motor 130 has a vertical motor shaft 134 and is controlled by the controller board. A carriage assembly drive cable 136 has terminal ends thereof wound about vertical motor shaft 134. An intermediate portion of the cable 136 is received about a pulley 138 which is mounted proximate a forward end of the housing.

A scanner carriage assembly 140 (FIGS. 2 and 3) is longitudinally displaceably mounted on shaft 120 and riser 122. The scanner carriage assembly 140 is attached to cable 136 which produces longitudinal movement thereof As best illustrated by FIGS. 3 and 4, a modular light source assembly 170 is mounted at a forward location on the carriage body 140.

Although scanner device 100 comprises two light source elements 180, 184 for illuminating the scan line, the light source of scanners today may comprises one or more light source elements. The modular light source assembly 170 comprises an elongate member 176 having a generally W-shaped cross-section, as shown in FIG. 4. The elongate member 176 has a forward portion 178 having a generally U-shaped cross-section which is adapted for supporting a first fluorescent bulb 180. The elongate member 176 also comprises a rear portion 182 having a generally U-shaped cross-section for supporting a second fluorescent bulb 184.

An electrical socket member 194, FIG. 3, is attached to one end of elongate member 176 and comprises two conventional fluorescent bulb female sockets therein adapted to receive conventional male socket portions of fluorescent bulbs 180 and 184, respectively. A flexible power cable 196 is operably attached to socket member 194 for providing electrical current to bulbs 180, 184. Independent end sockets 198, 200 are provided at the end of each fluorescent bulb and make electrical contact with male socket portions thereof. Each socket 198, 200 is connected by a pair of lead wires 202, 204 to an associated portion of socket member 194.

As illustrated in FIG. 4, some of the light from fluorescent bulbs 180, 184 is reflected from a narrow scan line region 206 of document 208 on transparent plate 108 and passes through slit 188 of the modular light source assembly 170, travels along a light path (not shown) inside the scanner 100 and ultimately impinges the photosensor array (not shown) of the scanner 100. Light slit 188 passes light reflected from a narrow scan line region 206 of document 208 and blocks all other light reflected from the document 208. The scan line region 206 from which light is reflected of course changes as scanner carriage assembly 140 moves relative to the document 208 during the actual scanning process.

A problem experienced in most line-focus systems, such as the one described above and with reference to FIGS. 1–4, is that the light intensity of the line image produced at the linear photosensor array (not shown) is not uniformly proportional to the light intensity at the line object. Generally, if a line object is evenly illuminated across its length, the light intensity at the sensor is much brighter in the area corresponding to the center of the line object than in the areas corresponding to the ends of the line object. This effect is quite significant; the intensity at the line image center may be roughly twice the intensity as that at the ends. There are several different optical effects which produce this problem. These optical effects are due mainly to the different distances of the various points on the line object from the central axis of the lens.

Further, in a system employing one or more fluorescent bulbs to illuminate a line of text, such as those in FIGS. 1–4, the light intensity output along the length of each of the bulbs is roughly of a sinusoidal pattern. That is, more light is output at the center of each bulb's length than at its ends.

Thus, if a line of printed text were positioned parallel to a fluorescent bulb, more light would hit the words at the center of the line than the words at either end of the line. As a consequence, assuming the black/white content was identical along the entire line of text, more light will be reflected off points at the center of the line of text than from points at the ends of the line of text. Since the electrical apparatus detects black and white areas along the scan line based on the amount of reflected light, the use of one or more uncorrected fluorescent bulbs to illuminate a scan line would require that the light sensitivity of each element in the electrical apparatus be tailored to its position with respect to the line of text. Since such customization would be quite expensive to implement, various techniques have been proposed to provide a substantially uniform light distribution at the input to the electrical conversion apparatus.

It is known in the prior art relating to line-focus systems to utilize an aperture positioned in the light path between a line object and a photosensor to differentially occlude light in the light path extending between the line object and the photosensor. Such "occluding" or "compensating" apertures are designed to occlude a proportionally greater portion of the light at the center of the light path than at the ends so as to make the light intensity at the photosensor uniformly proportional to the light intensity at the line object. One method for compensating in order to obtain a more uniform light intensity at the photosensor is disclosed in U.S. Pat. No. 5,019,703 by David W. Boyd et al, title OPTICAL SCANNER WITH MIRROR MOUNTED OCCLUDING APERTURE OR FILTER. Another method is described in U.S. patent application Ser. No. 08/551,013 by David D. Bohn, titled A LINE FOCUS SYSTEM WITH A SELF-ADHESIVE, OCCLUDING APERTURE LABEL ATTACHED TO A LIGHT SOURCE, now U.S. Pat. No. 5,726,446. Both of which are incorporated herein for all that they teach.

FIGS. 5–10 illustrate one solution to the non-uniform light intensity problem. FIG. 5 illustrates a line-focus system 310 having a light path 312 extending between an illuminated line object 314 and a linear photosensor array 316. A line image 318 of the illuminated line object 314 is projected onto the linear photosensor array 316 by a lens assembly 322. The linear photosensor array 316 as illustrated in the detail view of FIG. 6 comprises a plurality of linearly aligned photoelements 315, 317, 319 etc., which correspond to pixel locations on the line object 314. Each photoelement produces a signal proportionate to the intensity of light which it receives. Linear photosensors are well-known in the art.

An aperture member 324 having an aperture opening 326 which has a predetermined shape is adapted to be positioned at a predetermined aperture location 328 along the light path 312. The aperture member 324 is designed to partially occlude light in light path 312 to provide a light intensity across sensor 316 which is uniformly proportional to light intensity of the illuminated line object 314. The aperture member 324 is placed between the object 335 and the image.

In FIG. 5, an illumination device such as fluorescent bulb 334 provides light which is reflected from an object 335 having a white, planar forward surface 336. Optical scanners are equipped with one or more fluorescent bulbs in parallel, as described above with respect to FIGS. 1–4. The position and length of line object 314 on surface 336 is defined by the position and optical characteristics of an imaging lens 322 and by the length of linear photosensor array 316.

Component portions of light in light path 312 may be imagined, for purposes of explanation, as illustrated in FIG. 7. Light rays emanating from an end point 342 of illuminated line object 314 which pass through the clear aperture of lens 322 form a diverging, generally conically-shaped bundle 346. The light rays in light cone 346, after passing through lens assembly 322, form a second cone 347 which converges at image point 352. Similarly, light from a central point on line object 314 forms a generally conical light bundle 348 which, after passing through the clear aperture of lens assembly 322, converges, as illustrated at 349, into image line light point 354. Since line object 314 has an infinite number of light points, it will be appreciated that the light path 312 comprises an infinite number of overlapping light cones. A typical aperture placement in light path 312 is illustrated in FIG. 8. The central longitudinal axis XX of the aperture opening 326 is positioned coplanar with the central plane 360 of the light path and perpendicular to the lens and light path central longitudinal axes as represented by ZZ.

The overlapping of projected circle portion of light cones which occurs at aperture 324 is illustrated schematically in FIG. 9. Any region, e.g., 361, along the aperture axis XX necessarily occludes light from many different overlapping light circles, e.g., 362, 364, etc. (In FIG. 9, only a very small number of the nearly infinite number of overlapping light circles have been shown.) FIG. 9 also illustrates the general shape of the aperture opening 326. It is known from applicant's past design experience that the aperture opening should be generally "bow-tie" or "dog-bone" shaped in order to proportionally occlude more light at the center and less light at the ends of the light path.

A typical measurement of light intensity across the photosensor array in a line-focus system without an occluding aperture is illustrated in FIG. 10. The units on the horizontal axis are representative of the position of points or "pixels" on the line object since each element in the photosensor array is associated with a point (actually, a small area region) on the line object. The units for the pixel light intensity value are irrelevant for the purposes of the invention and may be any unit which the measurement system provides. It is preferable in a line-focus system that the light intensity be as even as possible, rather than more intense in the middle as shown in FIG. 10.

Heretofore, solutions to the problem of non-uniform light intensity, such as that described with respect to FIGS. 5–10, have usually consisted of an aluminum die casting or injection molded plastic part that was used to provide a more uniform light field and also to block out stray light from the optical system. The disadvantages of these prior solutions are the need for additional parts and part fasteners along with the assembly of the additional parts and part fasteners. These additional parts and part fasteners and the assembly thereof have also added to the cost of the optical scanner systems through additional parts and labor. These additional parts can also add to the size and weight of the optical scanner systems. Moreover, the use of these additional parts to occlude the light places limits on the location and the location tolerance of the line object, which generally creates a greater than desirable angle between the light source and the scan line.

Accordingly, there is a need in the field for a means to produce more uniform light intensity across the photosensor array which is proportional to the light intensity at a line object. Moreover, it would be desirable for such a means to have fewer parts, lower part costs, lower tooling costs and lower assembly costs than the solutions of the prior art. Moreover, there is a need for a solution that does not place limits on the location and the location tolerance of the line object.

Still further, it would be desirable to have a scanner with a scan line that is of similar length to the scan line of current scanners, but which allows the overall scanner length to be less than that of current scanners.

SUMMARY OF THE INVENTION

The present invention comprises a line-focus system with a curved bulb, wherein the curved bulb may provide similar light intensity as prior art scanners employing more than one bulb. The curved bulb may eliminate the need for one or more occluding apertures between either the light source and the scan line or between the scan line and the photosensor array. The curved bulb may eliminate the need for mounting hardware and the assembly time required to mount one or more occluding apertures. The curved bulb requires only one set of wires and only one bulb socket. The curved bulb of the present invention may eliminate one or more bulb sockets and corresponding wires over scanners of the prior art employing more than one bulb. Thus, the overall size and weight of a scanner with the curved bulb of the present invention may be less than a scanner of the prior art. Also, the complexity of powering on and stabilizing a curved bulb is far less than that required for more than one bulb.

DETAILED DESCRIPTION OF THE INVENTION

Figure 1:
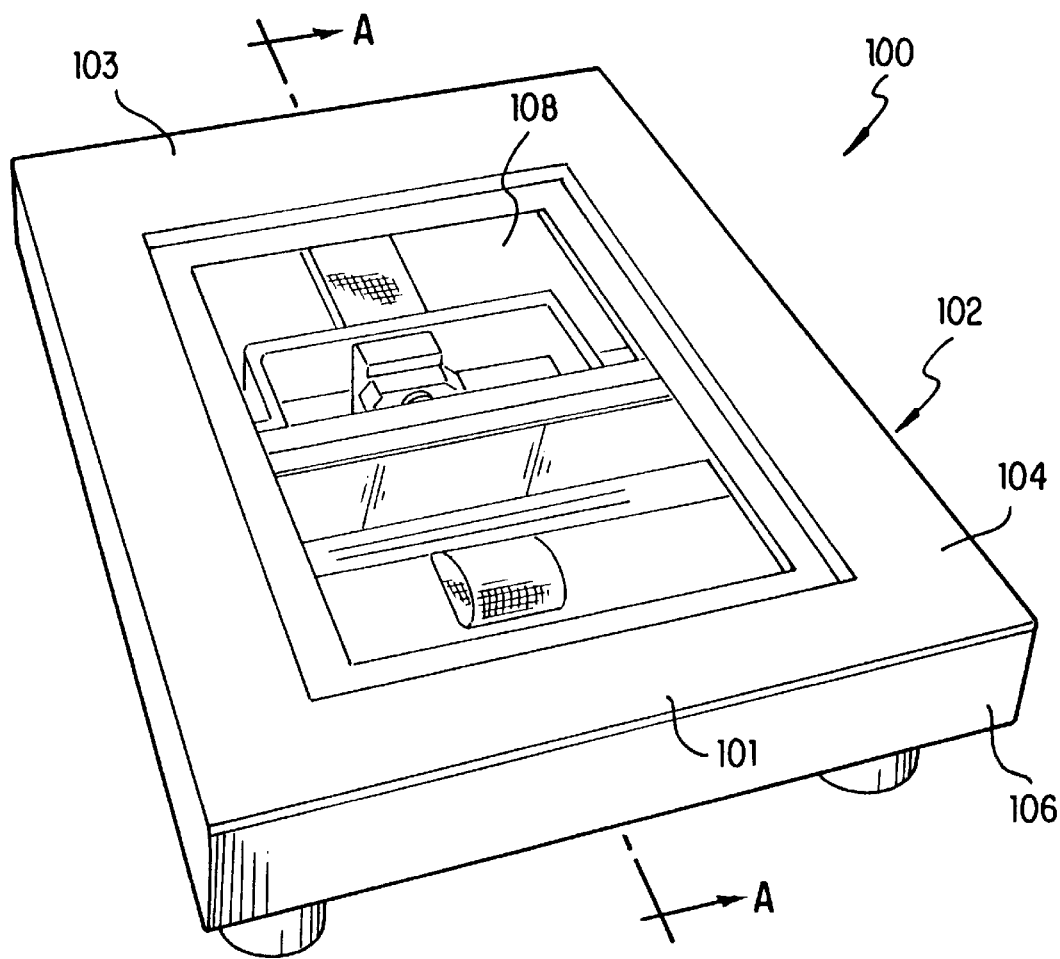
FIG. 1 is a top perspective view of an optical scanner.
Figure 2:
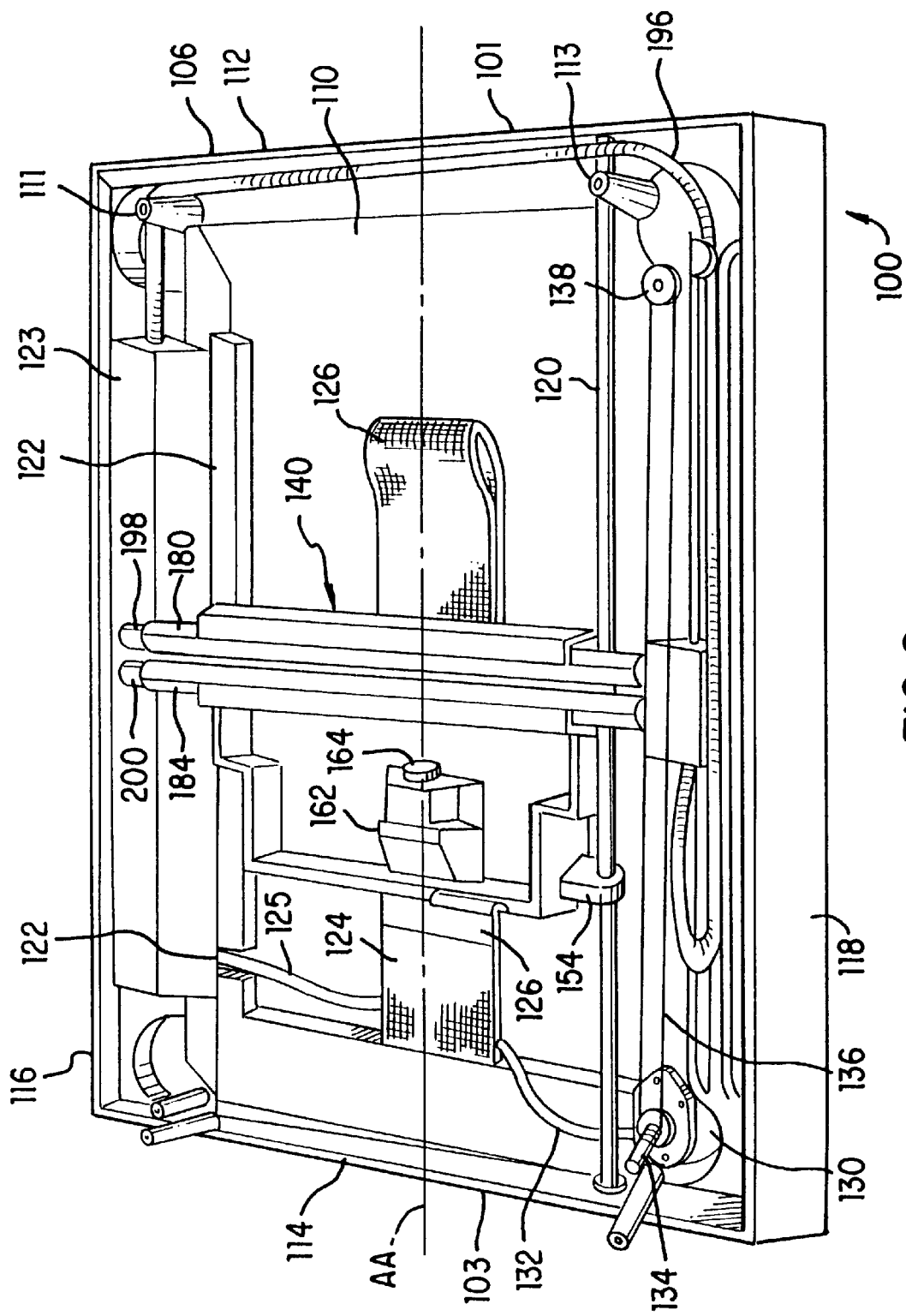
FIG. 2 is a top perspective view of an optical scanner according to FIG. 1 with an upper panel removed.
Figure 3:
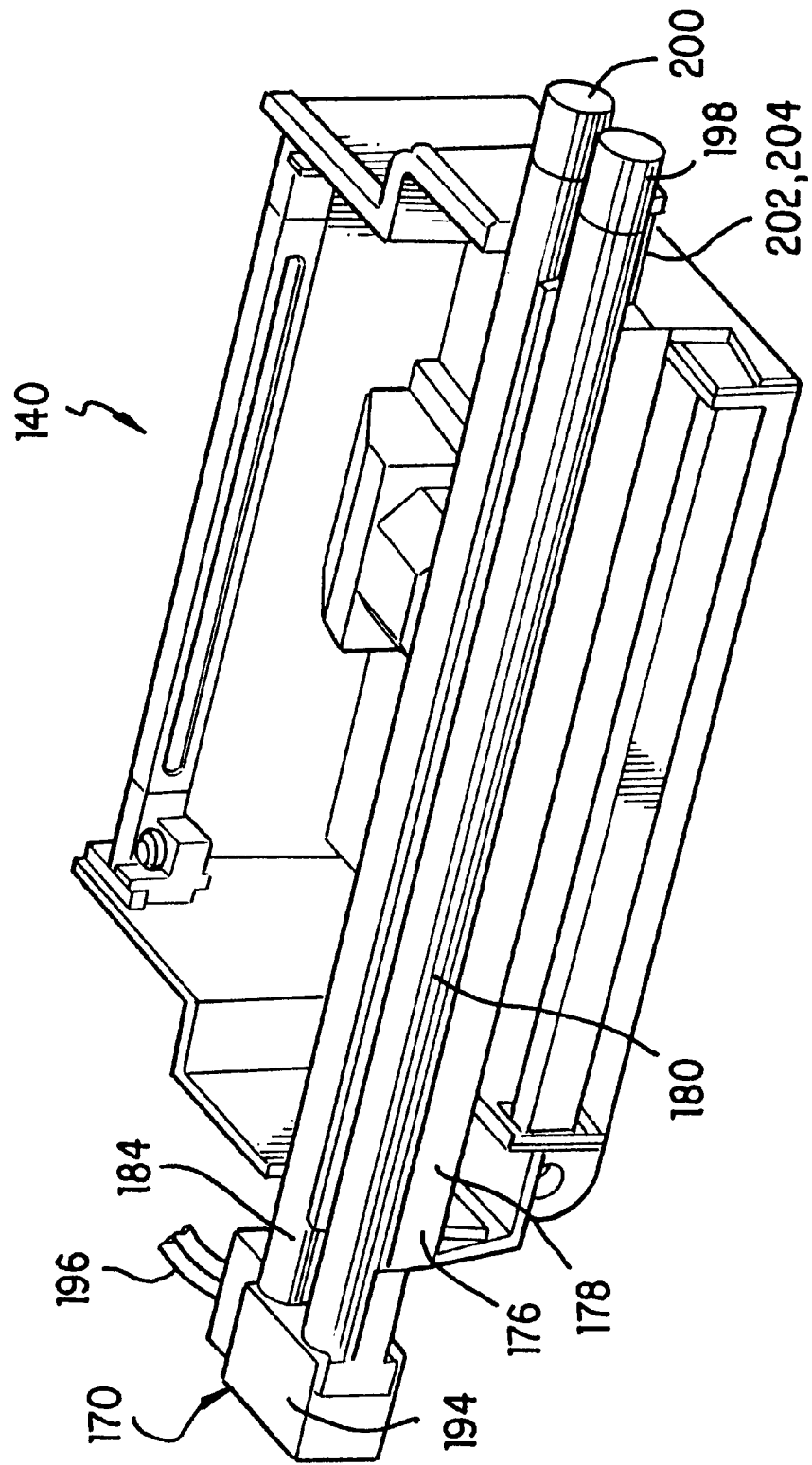
FIG. 3 is a perspective view of an optical scanner carriage assembly.
Figure 4:
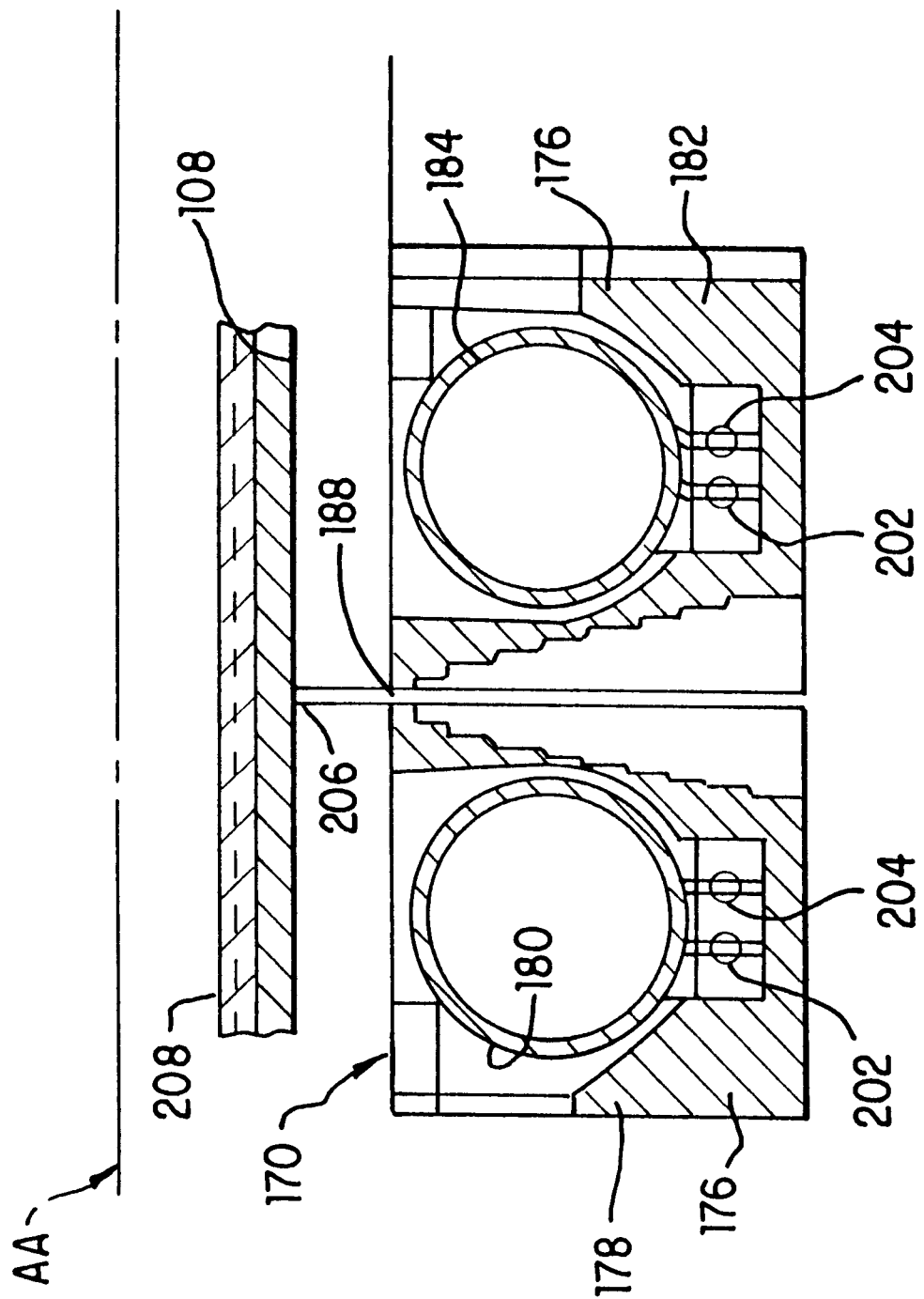
FIG. 4 is a cross-sectional view of a modular light source assembly of an optical scanner according to FIGS. 1–3.
Figure 5:
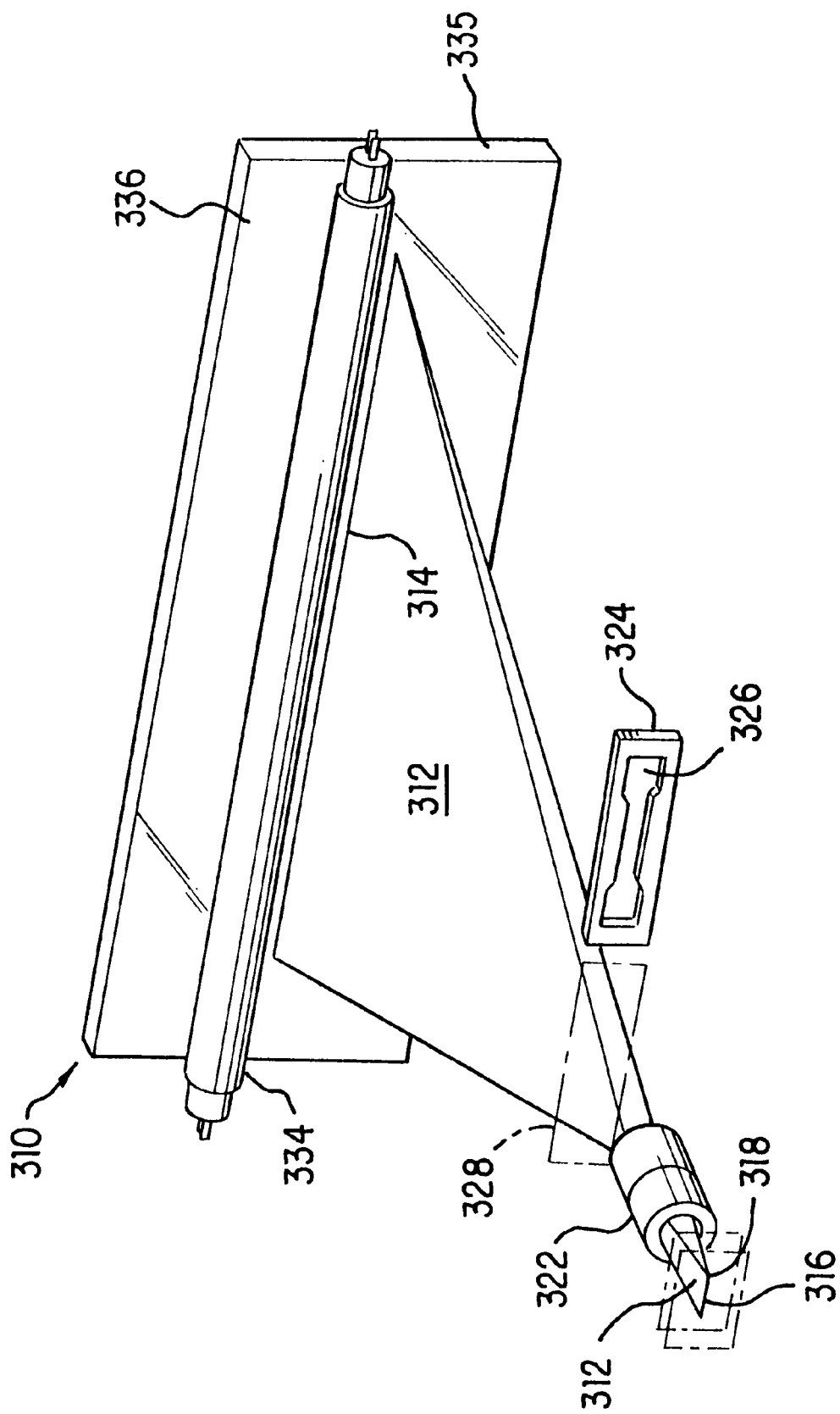
FIG. 5 is a schematic perspective view of a line-focus system.
Figure 6:
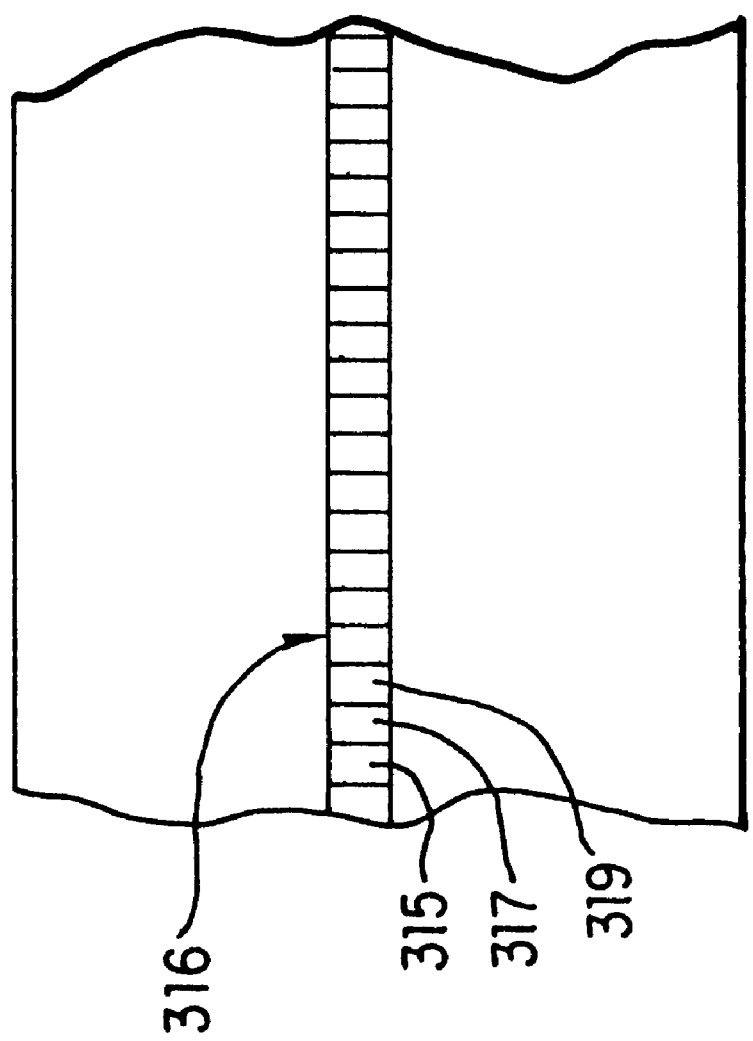
FIG. 6 is a detail plane view of a linear photosensor array.
Figure 7:
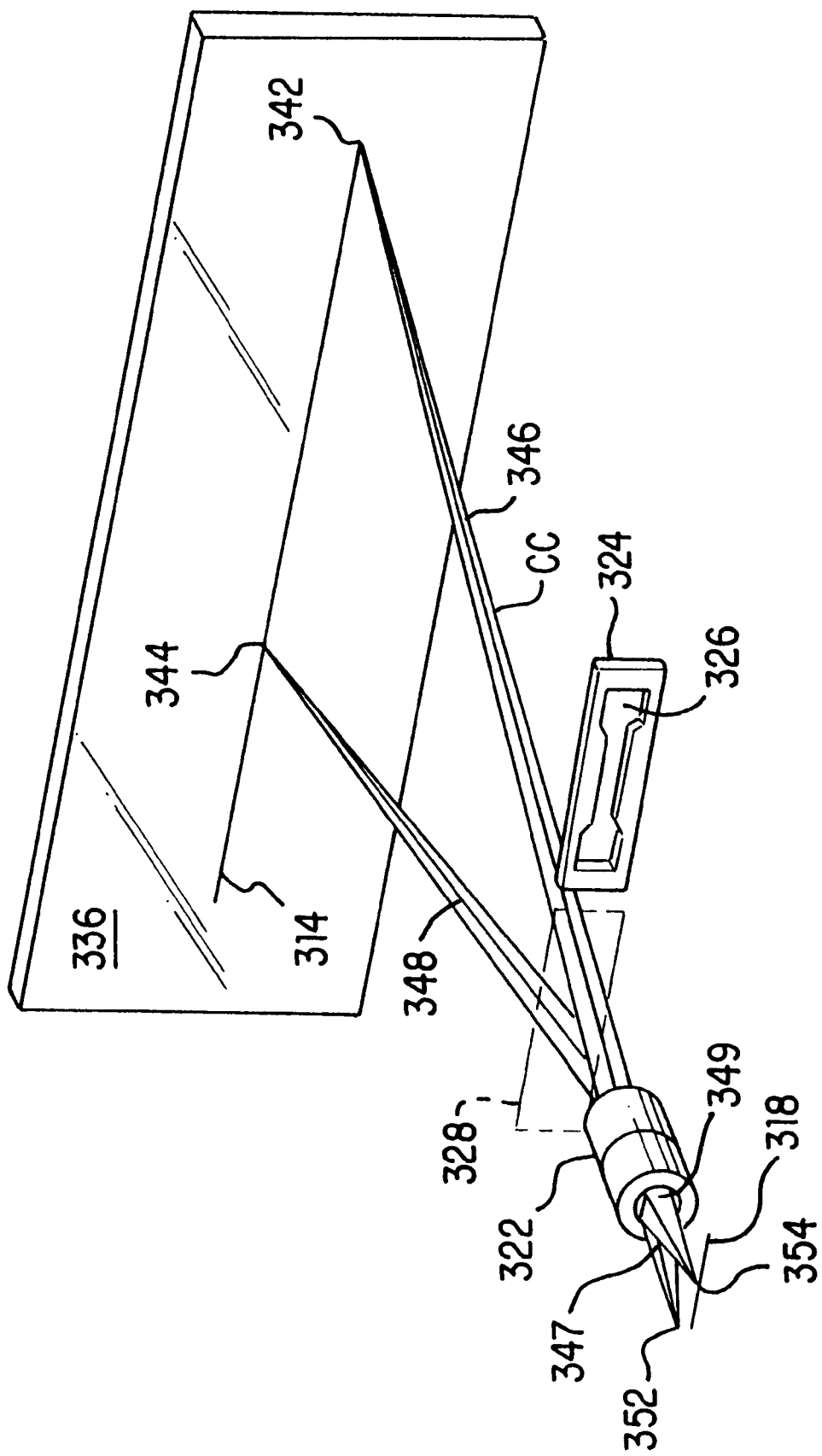
FIG. 7 is a schematic perspective view illustrating light cones associated with two light points in a line-focus system.
Figure 8:
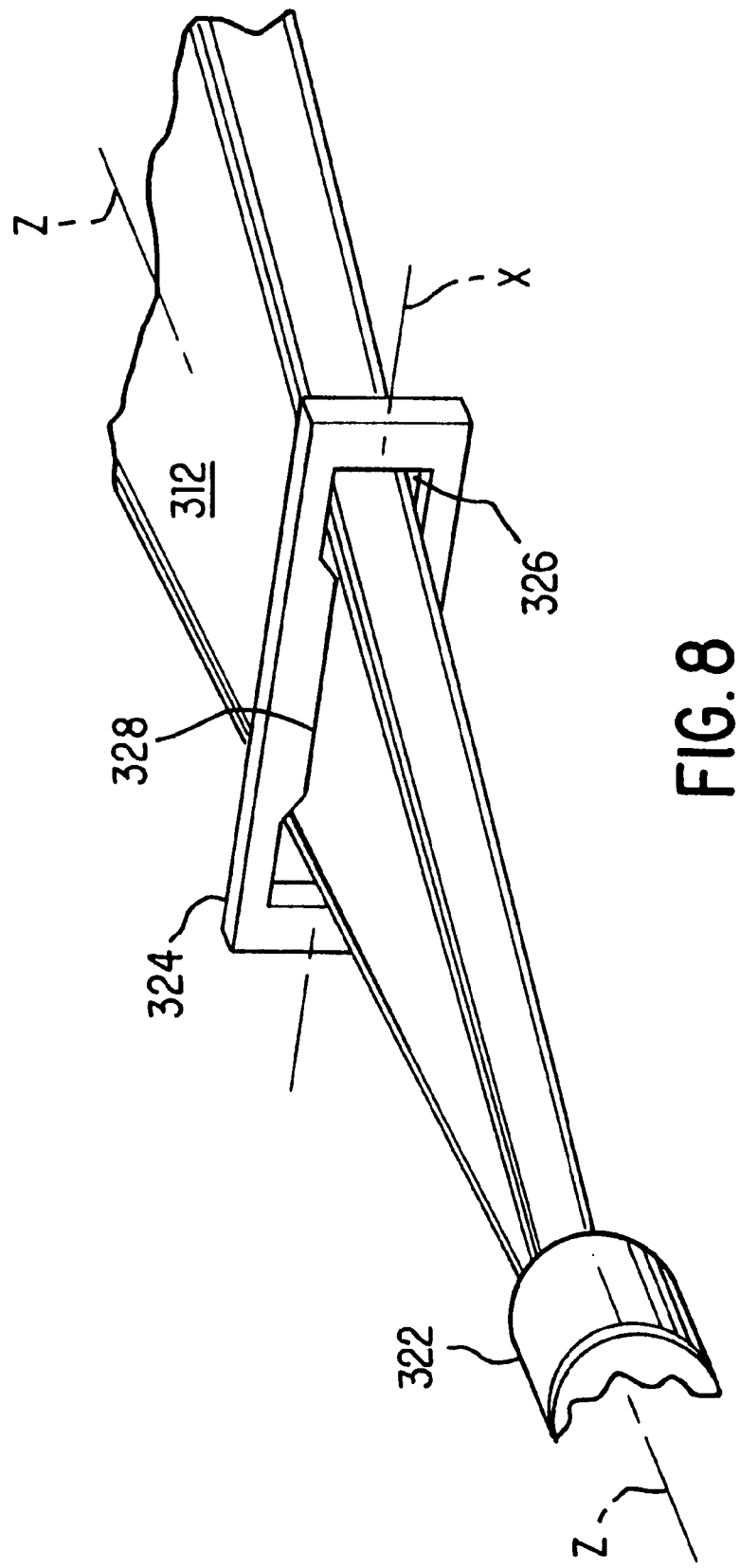
FIG. 8 is a perspective view of the line-focus system of FIG. 1 with an occluding aperture in place in the light path.
Figure 9:
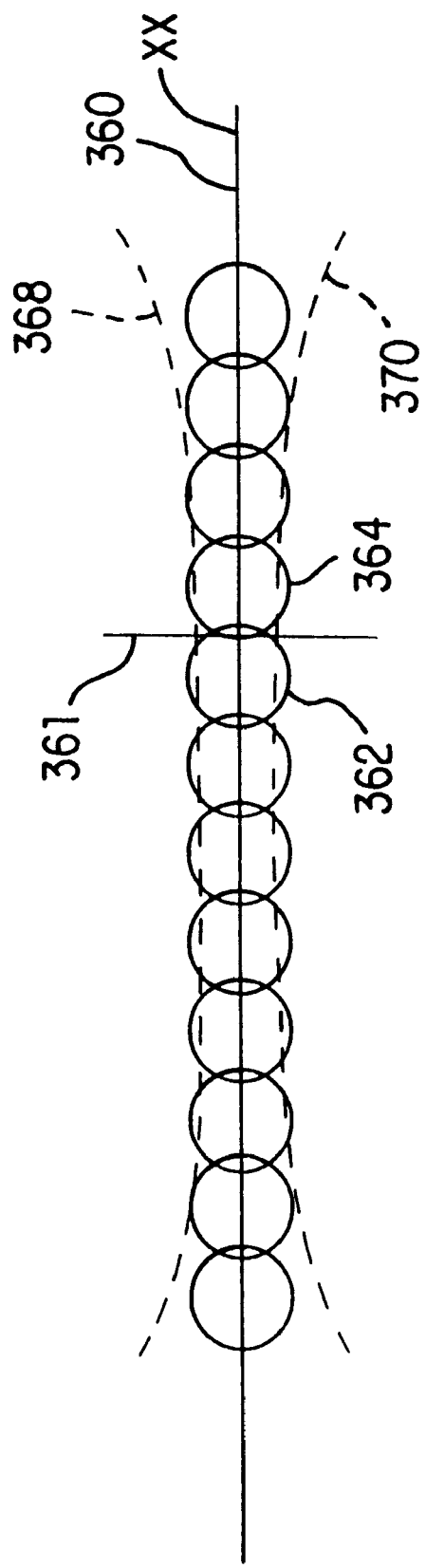
FIG. 9 is a schematic cross-sectional view of overlapping light cones in the plane of an occluding aperture.
Figure 10:
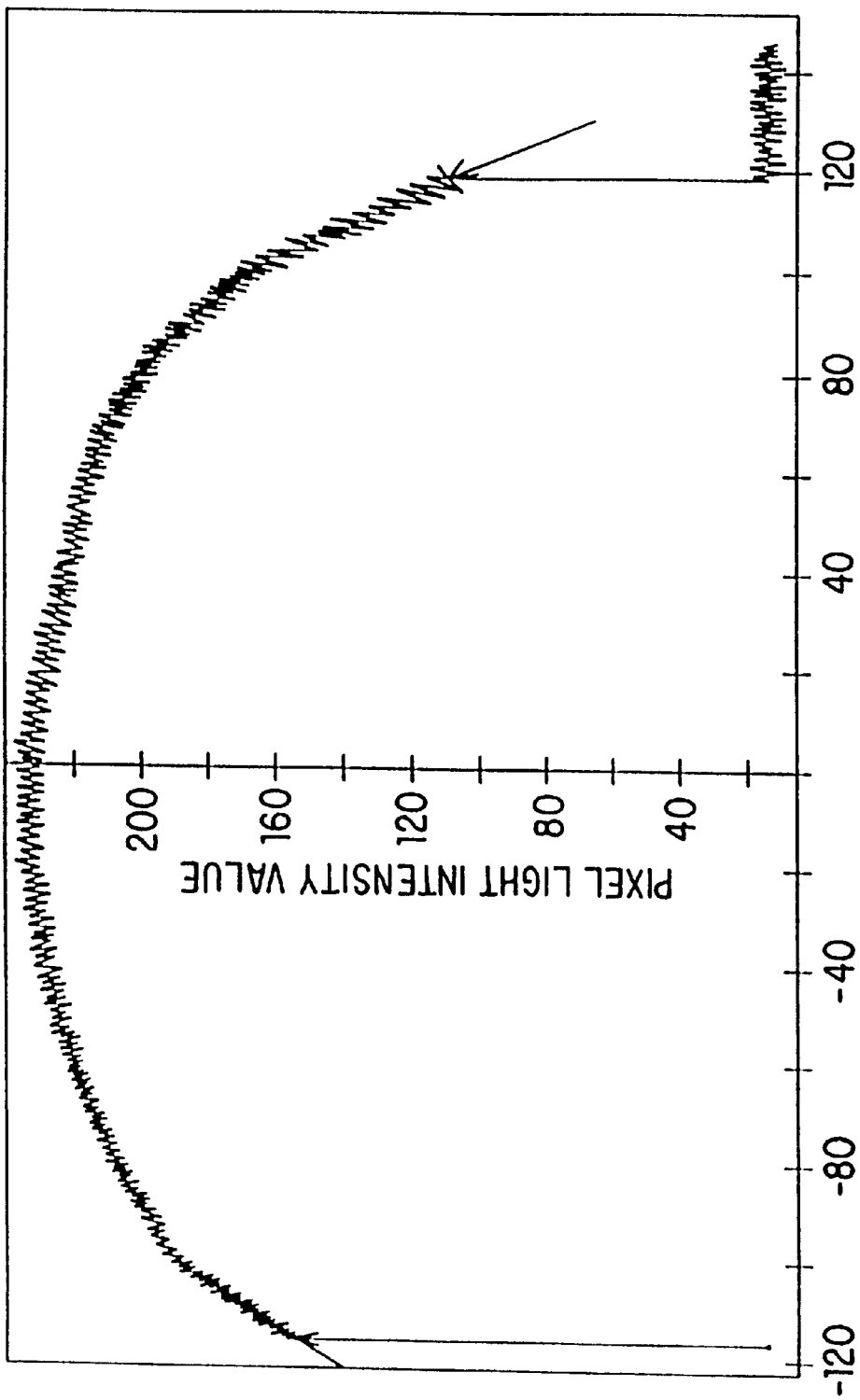
FIG. 10 is a graph representing measured light intensity in a line-focus system having no occluding aperture.
Figure 11:
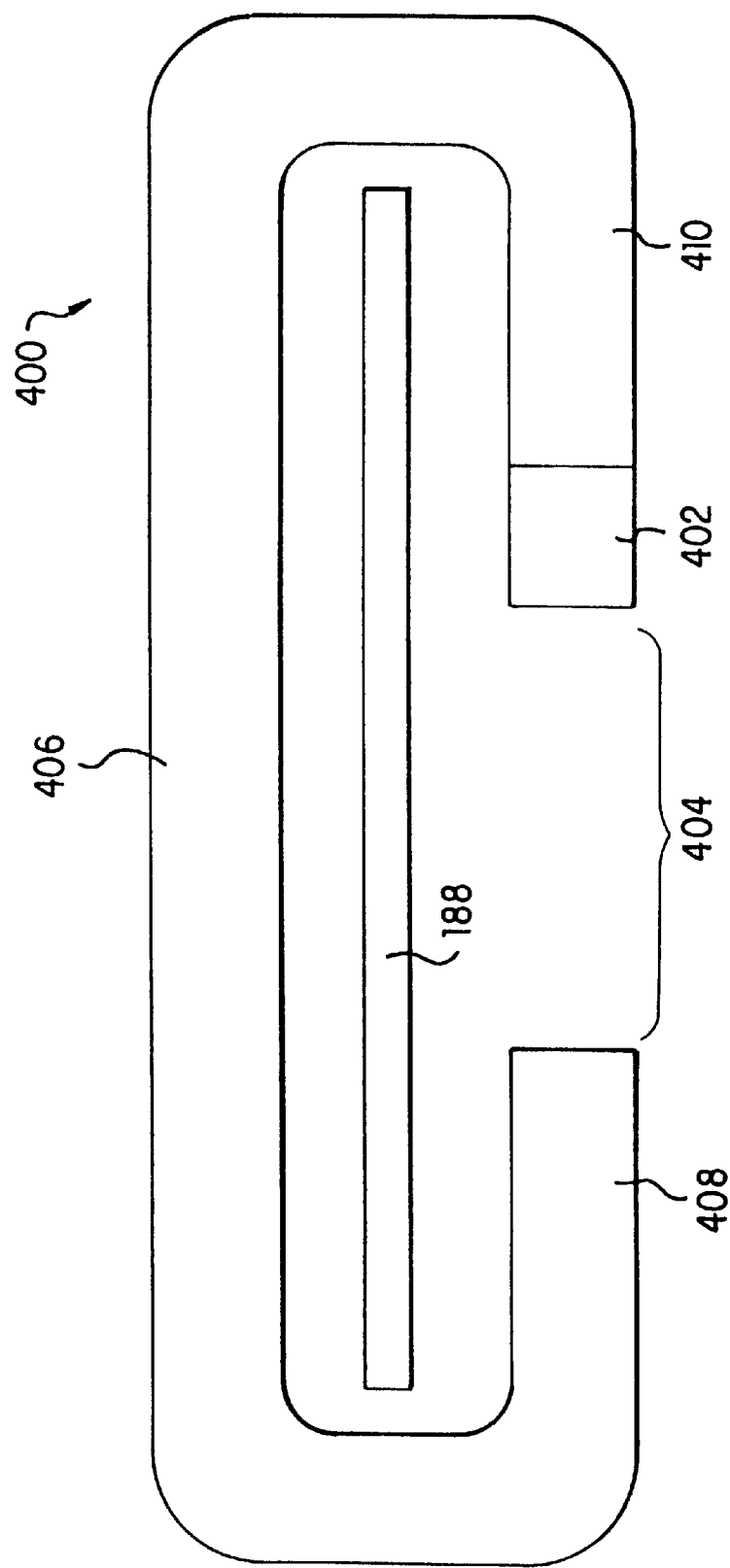
FIG. 11 is a C-shaped light bulb according to a first embodiment of the present invention.

FIG. 11 illustrates a C-shaped light bulb 400 according to the present invention. As can be seen in FIG. 11, C-shaped light bulb wraps around light slit 188 of the modular light source assembly 170 (not shown). Obviously, the modular light source assembly 170 can be modified to hold a C-shaped light bulb 400, rather than one or more cylindrical bulbs 180, 184. With a C-shaped light bulb 400, the central open space 404 of the "C" can be utilized for the bulb end socket 402 and other electrical components that are typically placed at the ends of cylindrical bulb solutions of the prior art, such as, for example, the pair of lead wires 202, 204; the electrical socket member 194; and the power cable 196 shown in FIGS. 2–3 above.

In a preferred embodiment, the C-shaped light bulb 400 is a fluorescent light bulb used in an optical scanner 100. It will be appreciated that in a fluorescent, C-shaped light bulb 400, the center of the light bulb at 406 will have a greater light intensity output than the ends 408 and 410 of the light bulb. Thus, it will be readily appreciated that the shape of the C-shaped light bulb will obviate the need for occluding, aperture means that an optical scanner utilizing one or more cylindrical light bulbs generally requires to provide uniform light intensity across the photosensor (not shown).

The advantages of the present invention over the typical lamp assembly aperture as shown in FIGS. 1–4 are fewer parts, lower assembly and disassembly costs, smaller overall scanner size and weight due to fewer parts, and cheaper overall scanner due to fewer parts. Also, from the time a scanner is turned on to the time a scanner is ready to actually perform a scan is determined by the amount of time that it takes for the one or more fluorescent bulbs to power on and stabilize. The complexity required to power on one bulb and determine whether it has stabilized is far less than the complexity required to power on more than one bulbs and determine whether light intensity emanating from all light sources has stabilized. Accordingly, the electronics and (not shown) for the power on and stabilization procedures may be significantly less for a scanner with the C-shaped bulb than the electronics and software required for the power on and stabilization procedures for a scanner with more than one cylindrical bulbs of the prior art. Moreover, the time that it takes for power on and stabilization of a scanner with the C-shaped bulb will probably be significantly less than the time that it takes for a scanner with more than one cylindrical bulbs, as many of the prior art scanners have, to power on and stabilize.

Figure 12:
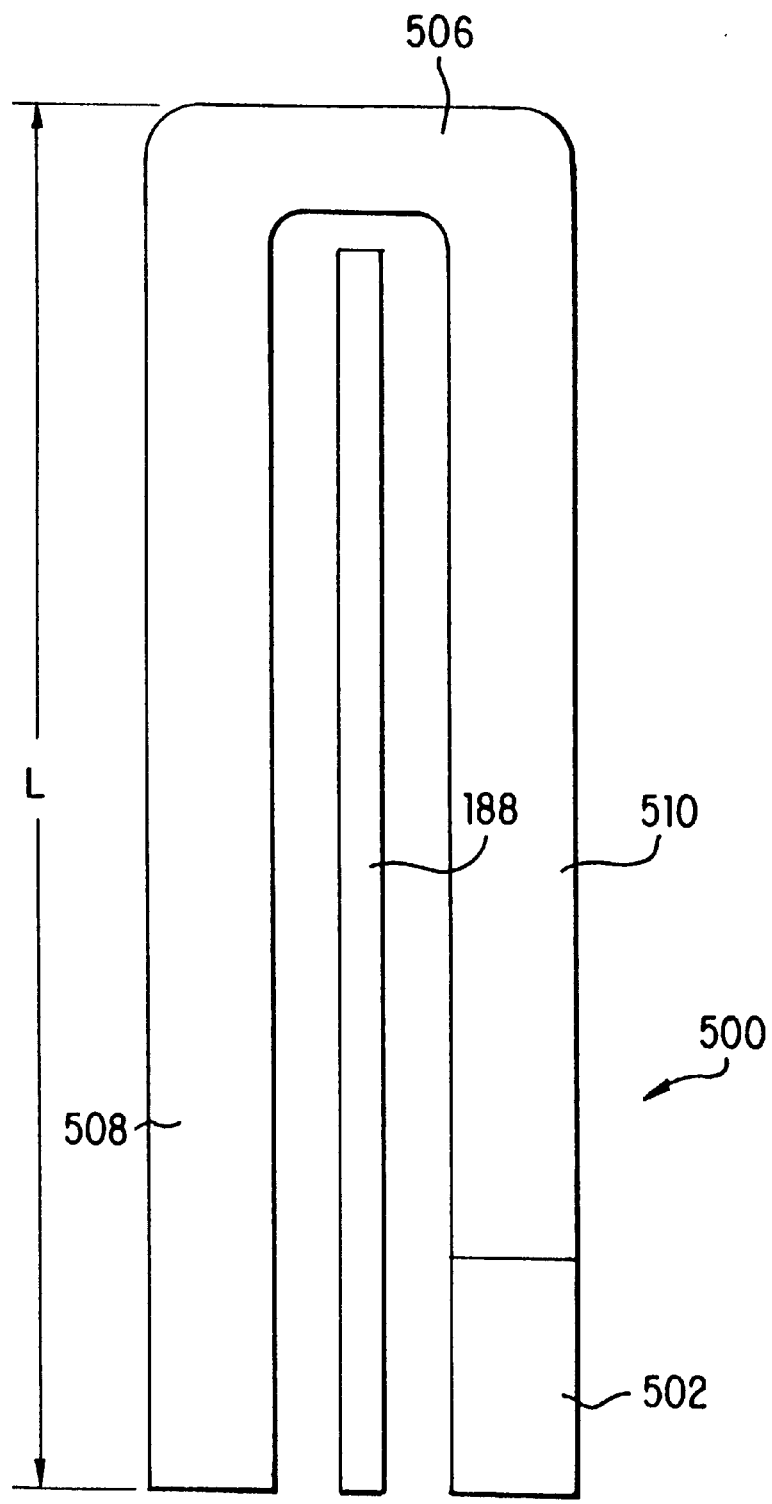
FIG. 12 is a U-shaped light bulb according to a second embodiment of the present invention.

One alternative embodiment to the C-shaped light bulb 400 is a U-shaped light bulb 500 as shown in FIG. 12. A U-shaped light bulb 500 would likely have a greater light intensity at the curved middle section 506 than at the ends 508 and 510, and thus, would require some type of occluding, aperture means or other light filtering means in order to create a more uniform light intensity across the photosensing elements of the scanner. However, U-shaped light bulb 500 would have a shorter length L than a straight, cylindrical light bulb of the prior art, and therefore, would allow for a shorter overall length in the corresponding scanner, while maintaining substantially the same length scan line as the prior art scanners.

Figure 13:
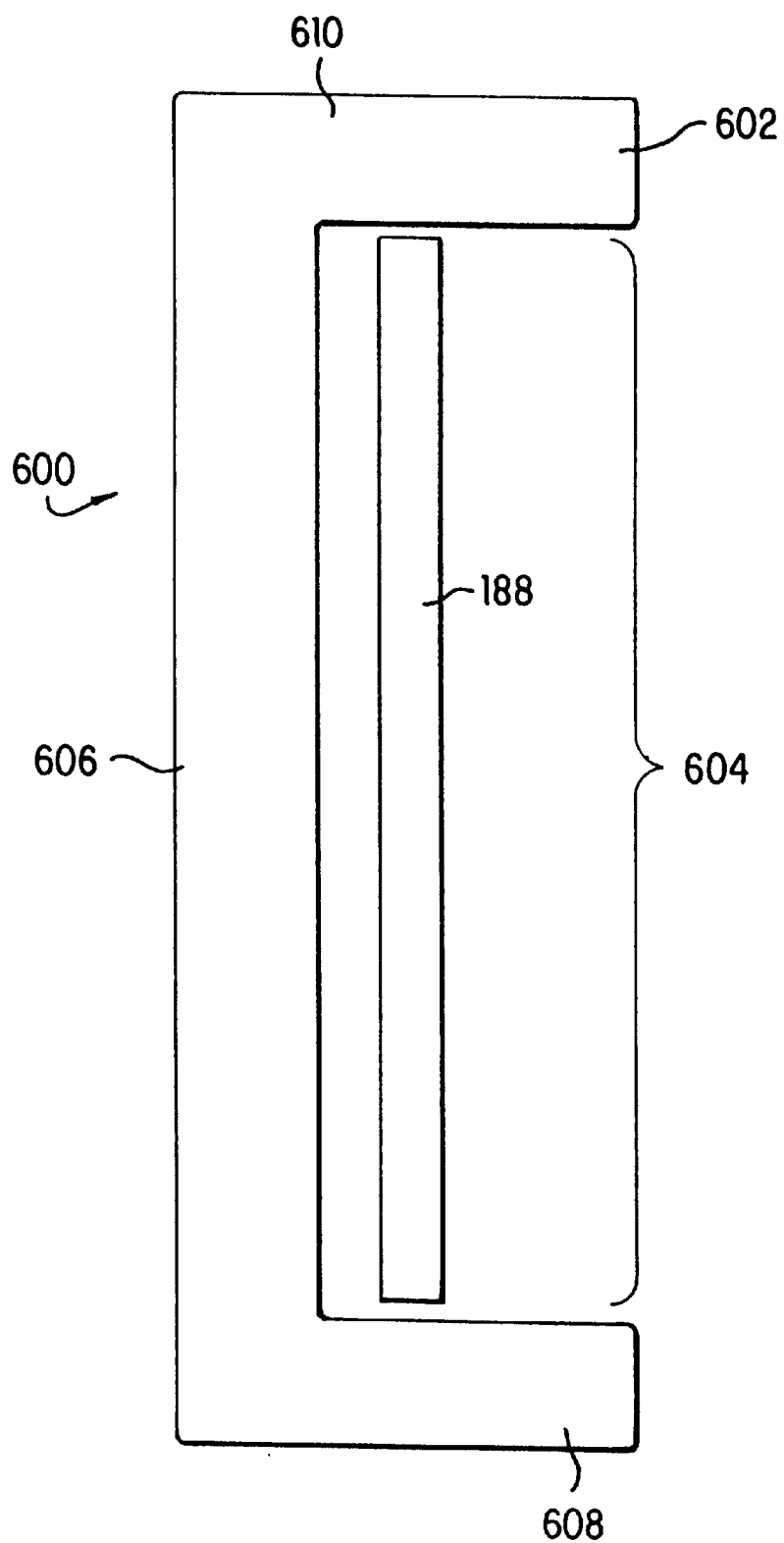
FIG. 13 is a towel bar-shaped light bulb according to a third embodiment of the present invention.

Another alternative embodiment of the present invention employs a towel bar-shaped light bulb 600 as shown in FIG. 13. As can be seen in FIG. 13, towel bar-shaped light bulb 600 wraps around light slit 188 of the modular light source assembly 170 (not shown). Obviously, the modular light source assembly 170 can be modified to hold a towel bar-shaped light bulb 600, rather than one or more cylindrical bulbs 180, 184. With a towel bar-shaped light bulb 600, the central open space 404 of the "towel bar" can be utilized for the bulb end socket 402 and other electrical components that are typically placed at the ends of cylindrical bulb solutions of the prior art, such as, for example, the pair of lead wires 202, 204; the electrical socket member 194; and the power cable 196 shown in FIGS. 2–3 above.

In a preferred embodiment, the towel bar-shaped light bulb 600 is a fluorescent light bulb used in an optical scanner 100. It will be appreciated that in a fluorescent, towel bar-shaped light bulb 600, the center of the light bulb at 606 will have a greater light intensity output than the ends 608 and 610 of the light bulb. Thus, it will be readily appreciated that the shape of the towel bar-shaped light bulb 600 will greatly obviate the need for occluding, aperture means that an optical scanner utilizing one or more cylindrical light bulbs generally requires to provide uniform light intensity across the photosensor (not shown).

Obviously, a C-shaped light bulb 400 or a towel bar-shaped light bulb 600 are the preferred embodiments as either would provide a more uniform light intensity across the scan line without additional light occluding or filtering means, than a U-shaped light bulb 500 along with the shorter overall light bulb length (as provided by U-shaped light bulb 500) over the straight, cylindrical light bulbs of the prior art.

It should also be noted that although the prior art and the present invention were described for a scanner with a moving light source, the concept of the invention could be readily embodied in an optical scanner with a stationary light source and a moving document, such as in an automatic document feed scanner. Also, the concepts of the present invention could be readily embodied in other document reproduction equipment, such as copiers, facsimile machines, printers, etc., where an object is reproduced by directing light in a line toward the object, moving the light relative to the object or vice versa, reflecting the light off of the object and toward a photosensor array, and producing an electrical signal representative of the document. Still further, although the present invention was described for fluorescent light bulbs, the concepts of the invention would also apply to other types of light sources, such as incandescent light bulbs. The importance of the present invention being the ability to create more uniform light intensity at the photosensor array with fewer elements and a simpler system than the prior art.

What is claimed is:

1. A line-focus system comprising:

a light source;

a scan line object, said light source adapted for directing light toward the scan line object;

a photosensor array; and a plate located between the light source and the photosensor array, said plate comprising a narrow light slit, wherein said plate passes light reflected from a narrow scan line region of the scan line object and directs the passed light onto the photosensor array while blocking all other light reflected from the scan line object from impinging on the photosensor array;

wherein said light source comprises a first end and a second end and a curved portion therebetween, wherein in said light source is curved around the narrow light slit in the plate resulting in light intensity across the photosensor array that is uniformly proportional to light intensity at the scan line object.

2. The line-focus system of claim 1, wherein said light source comprises a light bulb configured in a C-shape having a central open space such that the light bulb wraps around the narrow slit of the plate.

3. The line-focus system of claim 2, wherein said light bulb is fluorescent.

4. The line-focus system of claim 1, wherein said light source comprises a light bulb configured in a U-shape having a central open space such that the light bulb wraps around the narrow slit of the plate.

5. The line-focus system of claim 4, wherein said light bulb is fluorescent.

6. The line-focus system of claim 1, wherein said light source comprises a light bulb configured in a towel-bar-shape having a central open space such that the light bulb wraps around the narrow slit of the plate.

7. The line-focus system of claim 6, wherein said light bulb is fluorescent.

8. A method of manufacturing a line-focus system, said method comprising the following steps:

(a) providing a scan line object, a light source having a first end and second end and a curved portion therebetween, a photosensor array, and a plate comprising a narrow light slit;

(b) locating the plate between the light source and the photosensor array, such that the plate passes light reflected from a narrow scan line region of the scan line object and directs the passed light onto the photosensor array while blocking all other light reflected from the scan line object from impinging on the photosensor array;

(c) configuring the light source to wrap around the narrow slit to result in light intensity across the photosensor array that is uniformly proportional to light intensity at the scan line object when the light source directs light toward the scan line object.

9. A method according to claim 8, wherein said light source comprises a light bulb configured in a C-shape having a central open space such that the light bulb wraps around the narrow slit of the plate.

10. The line-focus system of claim 9, wherein said light bulb is fluorescent.

11. The line-focus system of claim 8, wherein said light source comprises a light bulb configured in a U-shape having a central open space such that the light bulb wraps around the narrow slit of the plate.

12. The line-focus system of claim 11, wherein said light bulb is fluorescent.

13. The line-focus system of claim 8, wherein said light source comprises a light bulb configured in a towel-bar-shape having a central open space such that the light bulb wraps around the narrow slit of the plate.

14. The line-focus system of claim 13, wherein said light bulb is fluorescent.

15. A line scan optical imaging system for scanning a line of a document comprising:

a light source;

a scan line object, said light source adapted for directing light toward the scan line object;

a photosensor array; and a plate located between the light source and the photosensor array, said plate comprising a narrow light slit, wherein said plate passes light reflected from a narrow scan line region of the scan line object and directs the passed light onto the photosensor array while blocking all other light reflected from the scan line object from impinging on the photosensor array;

wherein said light source comprises a first end and a second end and a curved portion therebetween, wherein in said light source is curved around the narrow light slit in the plate resulting in light intensity across the photosensor array that is uniformly proportional to light intensity at the scan line object.

16. The line scan optical imaging system of claim 15, wherein said light source comprises a light bulb configured in a C-shape having a central open space such that the light bulb wraps around the narrow slit of the plate.

17. The line scan optical imaging system of claim 16, wherein said light bulb is fluorescent.

18. The line scan optical imaging system of claim 15, wherein said light source comprises a light bulb configured in a U-shape having a central open space such that the light bulb wraps around the narrow slit of the plate.

19. The line-focus system of claim 18, wherein said light bulb is fluorescent.

20. The line scan optical imaging system of claim 15, wherein said light source comprises a light bulb configured in a towel-bar-shape having a central open space such that the light bulb wraps around the narrow slit of the plate.

21. The line scan optical imaging system of claim 20, wherein said light bulb is fluorescent.

22. A method of controlling light intensity of an image produced on a linear photosensor array in an optical scanner system, comprising:

directing light from a light source onto an object being scanned, said light source being located between the object and a photosensor array and having a first end and second end and a curved portion therebetween and wrapped around a narrow light slit in the plate; and focusing reflected light from a portion of the object that passes through the narrow light slit onto the photosensor array.

23. The method according to claim 22, wherein said light source comprises a light bulb configured in a C-shape having a central open space such that the light bulb wraps around the narrow slit of the plate.

24. The method according to claim 23, wherein said light bulb is fluorescent.

25. The method according to claim 22, wherein said light source comprises a light bulb configured in a U-shape having a central open space such that the light bulb wraps around the narrow slit of the plate.

26. The method according to claim 25, wherein said light bulb is fluorescent.

27. The method according to claim 22, wherein said light source comprises a light bulb configured in a towel-bar shape having a central open space such that the light bulb wraps around the narrow slit of the plate.

28. The method according to claim 27, wherein said light bulb is fluorescent.

* * * * *